June 14, 1932.  H. MARLES  1,862,692
STEERING CONTROL
Filed Nov. 25, 1929  2 Sheets-Sheet 1
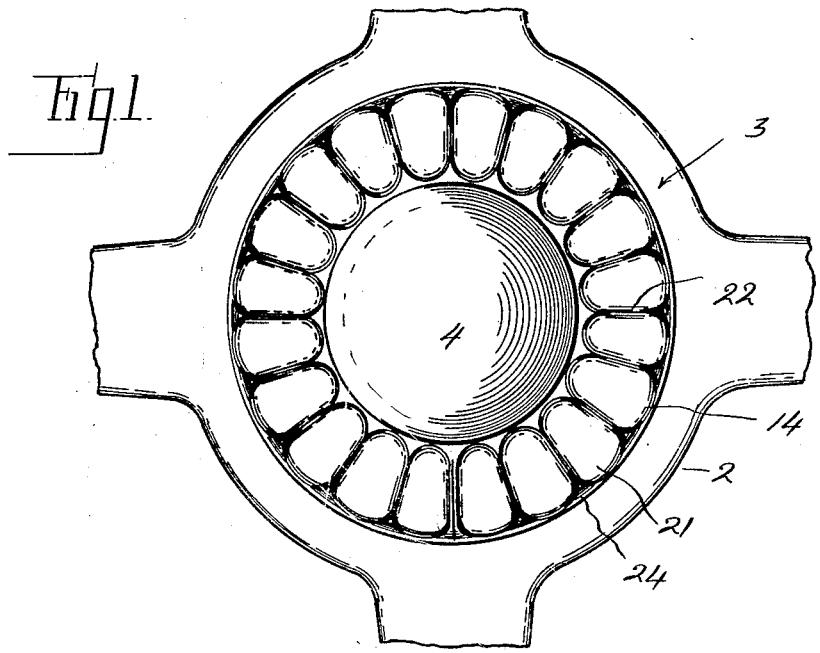
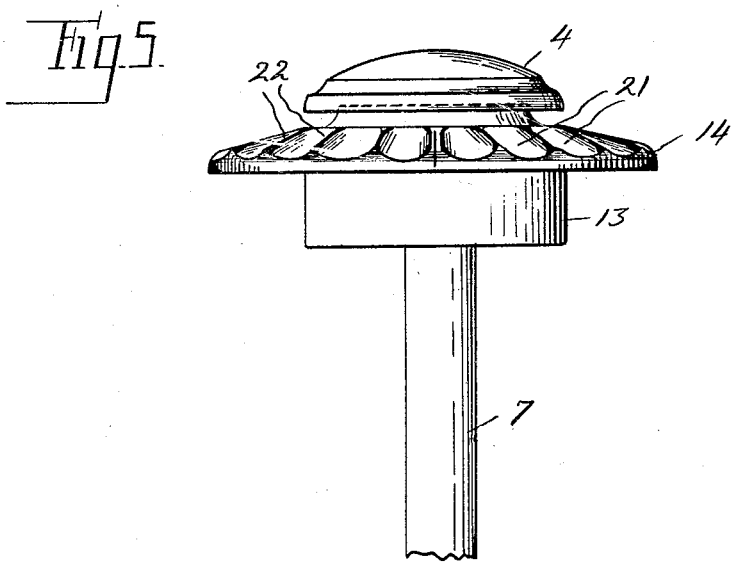
INVENTOR
Henry Marles
BY Whittemore Hulbert
Whittemore & Belknap
ATTORNEYS

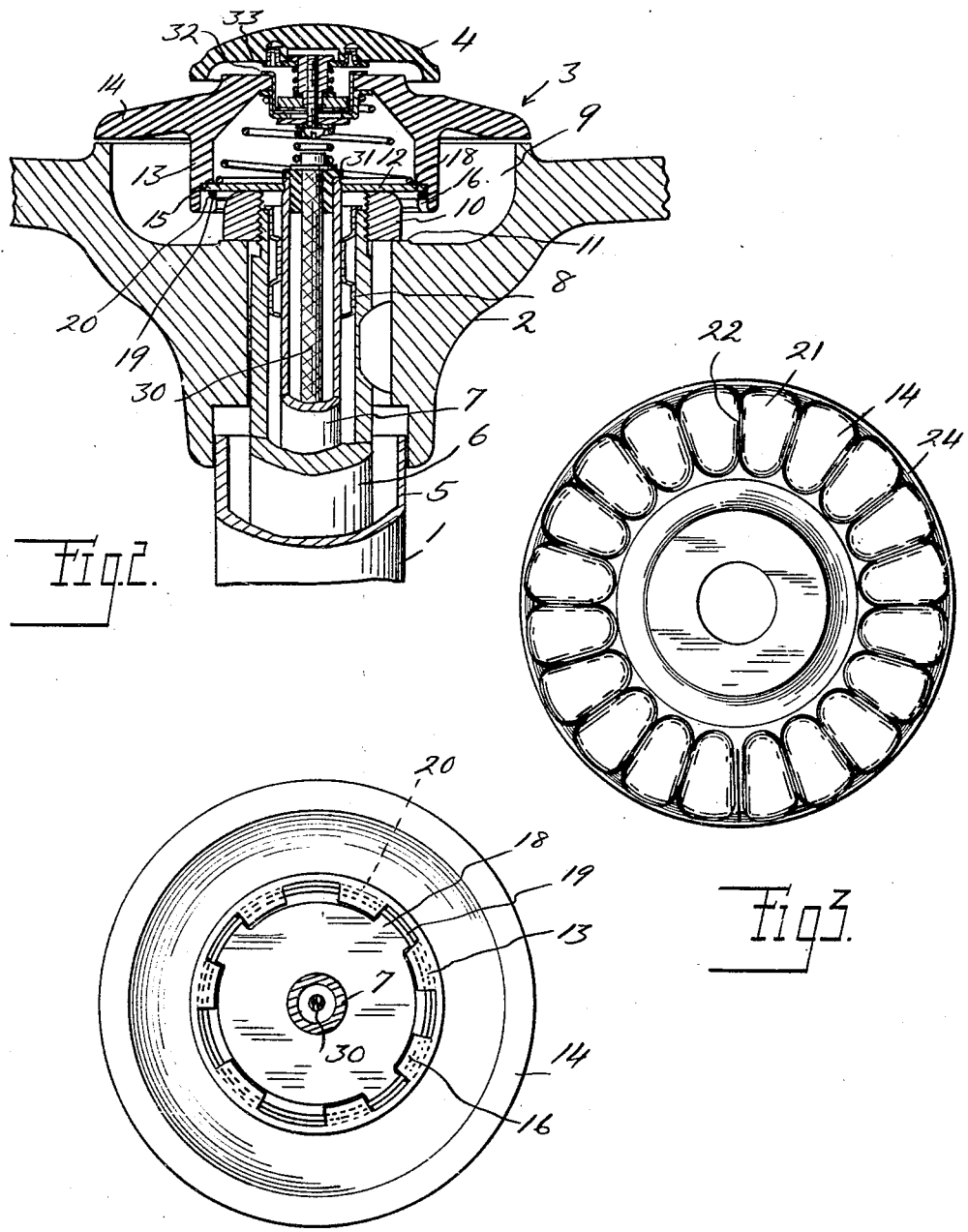

Patented June 14, 1932

1,862,692

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

STEERING CONTROL

Application filed November 25, 1929. Serial No. 409,598.

This invention relates generally to steering wheel control assemblies for motor vehicles and the like and refers more particularly to a control assembly located at the hub of the steering wheel.

One of the essential objects of the invention is to provide an assembly of this type in which a single control, such as an electric light control member, entirely devoid of actuating levers, cooperates with a depressible horn button to form a substantially flat cover or top plate for the hub of the steering wheel and has depressions therein that provide a pleasing appearance and serve as finger pieces by which the member may be manipulated.

Another object is to provide an assembly that is simple and compact in construction, that can be manufactured at a comparatively low cost and that is easy to install.

With the above and other objects in view the invention consists of certain novel features of construction, combinations and arrangements of parts that will be hereinafter more fully described and particularly pointed out in the appended claims:

In the accompanying drawings:

Figure 1 is a fragmentary top plan view of a steering wheel having an assembly embodying my invention;

Figure 2 is a vertical sectional view through the construction shown in Figure 1;

Figure 3 is a top plan view of the control per se;

Figure 4 is a bottom plan view of the control;

Figure 5 is a side elevation of the control.

Referring now to the drawings, 1 is a steering column, 2 is a steering wheel hub, 3 is a control, preferably an electric light control, and 4 is a depressible horn button of an assembly embodying my invention. As shown, the column 1 comprises a tubular housing 5 and inter-nested tubular shafts 6 and 7 respectively. Preferably the shaft 6 is the steering shaft and projects above the housing 5, and the shaft 7 is an electric light control shaft and projects slightly above the shaft 6. The last-mentioned shaft may be arranged to control a rotary switch (not shown) at the lower end of the column. Any suitable means such as the spring 8 between the shafts 6 and 7 may be used to afford frictional resistance to their relative movement. The steering wheel hub 2 is rigid with the shaft 6 just above the housing 5 and has a central recess 9 in its upper face. A nut 10 threadedly engages the shaft 6 and engages the base 11 of the recess 9, while a disk 12 rigid with the shaft 7 rests on the upper face of the nut 10 and serves as a support for the control 3. As shown this control comprises an inverted cup-shaped body 13 and a laterally extending peripheral flange 14. Preferably the body 13 receives the disk 12 and is provided adjacent its lower edges with an annular shoulder 15 and is provided at its lower edges with spaced transversely slotted lugs 16 that project inwardly in substantially parallel relation to the shoulder 15. The disk 12 has spaced radially extending lugs 18 received between the lugs 16 and engaging the annular shoulder 15. A split wire ring 19 engages the slots 20 in the lugs 16 and retains the lugs 18 in engagement with both the lugs 16 and the shoulder 15. The flange 14 extends over the edges 20 of the central recess 9 in the hub and is provided in its upper face with a series of radially extending elongated depressions 21. Preferably these depressions are arranged in the arc of a circle with the sides of the adjacent recesses forming inverted substantially V-shaped radially extending ridges 22. As shown, each depression 21 extends inwardly and converges slightly from the outer edges 24 of the flange and terminates in substantially vertical alignment with the side walls of the cup-shaped body 13. In the present instance the horn button 4 above the control 3 is circular and has an area substantially equal to the circle formed by the inner ends of the depressions 21. An electrical conductor or cable 30 is located in the shaft 7 and has its uper end held in a flanged bushing 31 at the upper end of the shaft. An electrical contact element 32 is electrically connected to the cable 30 and an electrical contact element 33 is carried by the lower face of the button 4 for engagement in the usual way with the contact element 32 when the button is depressed.

Thus from the foregoing it will be apparent that the control element 3 serves a dual function, i. e., that of a control member and as a cover for the steering wheel hub. Moreover, it is pleasing in appearance and is readily accessible.

What I claim as my invention is:

1. In a steering wheel control assembly, a steering column including a rotatable shaft, a control member having a recess and a series of integrally formed lugs extending into said recess, a disk like member rigid with said shaft and being formed with a plurality of peripheral lugs interlocking with the lugs aforesaid, and a ring engaging certain of said lugs and maintaining the parts in interlocked relation.

2. In a steering wheel control assembly, a steering column including a rotatable shaft, a control member having a recess and a series of integrally formed lugs extending into said recess, a disk like member rigid with said shaft and being formed with a plurality of peripheral lugs interlocking with the lugs aforesaid, said first mentioned lugs being provided with grooves, and a resilient ring received in said grooves for maintaining said lugs in interlocking relation.

In testimony whereof I affix my signature.

HENRY MARLES.